(12) United States Patent
Klinkenberg et al.

(10) Patent No.: US 11,898,971 B2
(45) Date of Patent: Feb. 13, 2024

(54) CONTROLLING PROCESS PARAMETERS BY MEANS OF RADIOGRAPHIC ONLINE DETERMINATION OF MATERIAL PROPERTIES WHEN PRODUCING METALLIC STRIPS AND SHEETS

(71) Applicants: SMS group GmbH, Düsseldorf (DE); IMS Messsysteme GmbH, Heiligenhaus (DE)

(72) Inventors: Christian Klinkenberg, Herdecke (DE); Ulrich Sommers, Düsseldorf (DE); Helmut Klein, Osterode (DE); Alexandre Lhoest, Eupen (BE); Olivier Pensis, Montegnee (BE); Horst Krauthäuser, Heiligenhaus (DE)

(73) Assignees: SMS group GmbH, Dusseldorf (DE); IMS Messsysteme GmbH, Heiligenhaus (DE)

( * ) Notice: Subject to any disclaimer, the term of this patent is extended or adjusted under 35 U.S.C. 154(b) by 26 days.

(21) Appl. No.: 17/622,535

(22) PCT Filed: Jun. 24, 2020

(86) PCT No.: PCT/EP2020/067593
§ 371 (c)(1),
(2) Date: Dec. 23, 2021

(87) PCT Pub. No.: WO2020/260336
PCT Pub. Date: Dec. 30, 2020

(65) Prior Publication Data
US 2022/0357290 A1  Nov. 10, 2022

(30) Foreign Application Priority Data
Jun. 24, 2019 (DE) .................... 10 2019 209 068.0

(51) Int. Cl.
*G01N 23/20008* (2018.01)
*G01N 23/205* (2018.01)
(Continued)

(52) U.S. Cl.
CPC ..... *G01N 23/20008* (2013.01); *G01N 23/205* (2013.01); *G01N 23/207* (2013.01);
(Continued)

(58) Field of Classification Search
CPC ............ G01N 23/20; G01N 23/20008; G01N 23/20091; G01N 23/201; G01N 23/205;
(Continued)

(56) References Cited

U.S. PATENT DOCUMENTS 3,610,984 A * 10/1971 Seki ................. H01J 35/10
378/115
6,005,913 A * 12/1999 Zombo .............. G01N 23/20
378/71
(Continued)

FOREIGN PATENT DOCUMENTS

CN   H04262300 A   9/1992
CN   201594172 U   9/2010
(Continued)

OTHER PUBLICATIONS

H. Legall et al., Anew Generation of X-Ray Optics Based on Pyrolytic Graphite, p. 798-801, Proceedings of FEL 2006, Bessy, Berlin, Germany. (Year: 2006).*
(Continued)

*Primary Examiner* — Allen C. Ho
(74) *Attorney, Agent, or Firm* — Maier & Maier, PLLC

(57) ABSTRACT

A method and a device for determining the material properties of a polycrystalline, in particular metallic, product during production or quality control of the polycrystalline, in particular metallic, product by means of X-ray diffraction
(Continued)

using at least one X-ray source and at least one X-ray detector. In this case, an X-ray generated by the X-ray source is directed onto a surface of the polycrystalline product and the resulting diffraction image of the X-ray is recorded by the X-ray detector. After exiting the X-ray source, the X-ray is passed through an X-ray mirror, wherein the X-ray is both monochromatized and focused, by the X-ray mirror, in the direction of the polycrystalline product and/or the X-ray detector, and then reaches a surface of the metallic product.

33 Claims, 8 Drawing Sheets

(51) Int. Cl.
    *G01N 23/207*     (2018.01)
    *G01N 23/20091*     (2018.01)
    *H01J 35/08*     (2006.01)
    *H01J 35/10*     (2006.01)

(52) U.S. Cl.
    CPC ........ *G01N 23/20091* (2013.01); *H01J 35/08* (2013.01); *H01J 35/10* (2013.01); *H01J 35/112* (2019.05); *H01J 35/116* (2019.05); *G01N 2223/056* (2013.01); *G01N 2223/1016* (2013.01); *G01N 2223/20* (2013.01); *G01N 2223/315* (2013.01); *G01N 2223/316* (2013.01); *G01N 2223/606* (2013.01); *G01N 2223/624* (2013.01)

(58) Field of Classification Search
    CPC ........... G01N 23/207; G01N 2223/056; G01N 2223/0561; G01N 2223/0563; G01N 2223/1016; G01N 2223/313; G01N 2223/315; G01N 2223/316; G01N 2223/624; G01N 23/203; G01N 2223/606; H01J 35/02; H01J 35/06; H01J 35/08; H01J 35/10; H01J 35/112; H01J 35/116
    USPC ........ 378/71–76, 84, 85, 124, 125, 143, 144
    See application file for complete search history.

(56) References Cited

U.S. PATENT DOCUMENTS

| | | | | |
|---|---|---|---|---|
| 6,041,099 A * | 3/2000 | Gutman | ................... | G21K 1/06 378/85 |
| 6,163,592 A * | 12/2000 | He | ......................... | G01N 23/20 378/70 |
| 6,278,764 B1 | 8/2001 | Barbee, Jr. et al. | | |
| 6,560,315 B1 * | 5/2003 | Price | .................... | H01J 35/108 378/144 |
| 6,821,361 B2 * | 11/2004 | Fujimura | ............. | G01N 33/208 148/508 |
| 6,993,113 B2 * | 1/2006 | Hoshino | .............. | G01N 23/201 378/70 |
| 7,248,670 B2 * | 7/2007 | Hoghoj | .................... | G21K 1/06 378/85 |
| 7,258,485 B2 * | 8/2007 | Nakano | ............ | G01N 23/20016 378/197 |
| 7,400,705 B2 * | 7/2008 | Hoshino | .............. | G01N 23/207 378/80 |
| 7,583,789 B1 * | 9/2009 | MacDonald | ............. | G21K 7/00 378/70 |
| 7,634,052 B2 * | 12/2009 | Grodzins | ................. | G21K 1/06 378/90 |
| 7,978,821 B1 * | 7/2011 | Glavicic | .............. | G01N 23/203 378/76 |
| 7,991,116 B2 * | 8/2011 | Chen | ........................ | G21K 1/06 250/503.1 |
| 8,243,878 B2 * | 8/2012 | Yokhin | ................ | G01N 23/207 378/70 |
| 8,422,633 B2 * | 4/2013 | Lantz | ............... | G01N 23/20008 378/85 |
| 8,437,450 B2 * | 5/2013 | Wall | ..................... | G01N 23/207 378/73 |
| 8,687,766 B2 * | 4/2014 | Wormington | ............ | G01T 7/00 378/70 |
| 9,110,004 B2 * | 8/2015 | Feser | ................... | G01N 23/046 |
| 9,279,776 B2 * | 3/2016 | Kleine | ..................... | G21K 1/02 |
| 9,448,190 B2 * | 9/2016 | Yun | ....................... | H01J 35/147 |
| 9,594,036 B2 * | 3/2017 | Yun | ...................... | G01N 23/223 |
| 9,823,203 B2 * | 11/2017 | Yun | ..................... | G01N 23/205 |
| 10,295,486 B2 * | 5/2019 | Yun | ..................... | G01N 23/223 |
| 10,317,350 B2 * | 6/2019 | Chen | ................. | G01N 33/1813 |
| 10,429,326 B2 * | 10/2019 | Hoffman | ................. | G21K 1/06 |
| 10,473,598 B2 * | 11/2019 | Ogata | ................ | G01N 23/2204 |
| 10,578,566 B2 * | 3/2020 | Yun | .................... | G01N 23/2209 |
| 10,753,890 B2 * | 8/2020 | Beckers | .......... | G01N 23/20091 |
| 10,876,978 B2 * | 12/2020 | Ogata | ............. | G01N 23/20025 |
| 10,976,268 B2 * | 4/2021 | Wormington | .... | G01N 23/20025 |
| 10,976,270 B2 * | 4/2021 | Wormington | ........ | G01N 23/223 |
| 11,054,375 B2 * | 7/2021 | Seidler | ............ | G01N 23/20091 |
| 11,079,345 B2 * | 8/2021 | Matsushima | ........ | G01N 23/207 |
| 11,143,604 B1 * | 10/2021 | Kuznetsov | ............. | G01B 15/08 |
| 11,181,490 B2 * | 11/2021 | Dikopoltsev | ........ | G01N 23/207 |
| 11,217,357 B2 * | 1/2022 | Yun | ..................... | G01N 23/205 |
| 11,333,621 B2 * | 5/2022 | Wack | ................... | G01N 23/201 |

FOREIGN PATENT DOCUMENTS

| | | |
|---|---|---|
| DE | 10056508 A1 | 4/2002 |
| EP | 0352423 B1 | 9/1993 |
| EP | 1233265 A1 | 8/2002 |
| EP | 3062094 A1 | 8/2016 |
| EP | 3372994 A1 | 9/2018 |
| JP | S561341 A | 1/1981 |
| JP | S56100348 A | 8/1981 |
| JP | S6110749 A | 1/1986 |
| JP | 2002541496 A | 12/2002 |
| WO | 2008/125680 A1 | 10/2008 |
| WO | 2017/157692 A1 | 9/2017 |
| WO | 2017/202904 A1 | 11/2017 |

OTHER PUBLICATIONS

International Search Report (with English translation) and Written Opinion (with Machine translation) dated Oct. 12, 2020 in corresponding International Application No. PCT/EP2020/067593; 18 pages.
International Preliminary Report on Patentability dated Nov. 11, 2021 in corresponding International Application No. PCT/EP2020/067593; 61 pages.
Hermann-I. Kopineck et al. "Industrial on-line texture determination in rolled steel strips" Journal of Nondestructive Evaluation., US. vol. 12. No. 1. Mar. 1, 1993 (Mar. 1, 1993). pp. 13-19, 8 pgs.
Written Opinion by IPEA dated Mar. 9, 2021 in corresponding International Application No. PCT/EP2020/067593; 15 pages.
Tamura N et al: "Submicron X-ray diffraction and its applications to problems in materials and environmental science," Review of Scientific Instruments, AIP, Melville, NY, US, vol. 73, No. 3, Mar. 1, 2002 (Mar. 1, 2002), pp. 1369-1372, 4 pgs.
H. E. Göbel, "A new flat Goebel-mirror for the aptimization of the primar beam in Bragg-Brentano diffraction geometry", Microstructure Analysis in Material Sciene, Freiberg, Jun. 15-17, 2005, 4 pgs.
G. Jost et al, "Imaging-Therapy computed tomography with quasi-monochromatic X-Rays", European Journal of Radiology, 68S (2008) S63-S68, 6 pgs.
G. Jost et al., "Imaging-Therapy computed tomography", Bayer Schering Pharma AG, Berlin, Jan. 10, 2008, 36 pgs, English summary included.
H. - J. Bunge, "Texture Analysis in Material Science", published in the former German Democratic Republic by Akademic-Verlag. Berlin, in 1969., 308 pgs.

(56) References Cited

OTHER PUBLICATIONS

Office Action dated Nov. 2, 2022, in corresponding Japanese Application No. 2021576736, 6 pages.
Office Action dated Jun. 30, 2023, in corresponding Chinese Application No. 202080046601.X, 10 pages.

* cited by examiner

CONTROLLING PROCESS PARAMETERS BY MEANS OF RADIOGRAPHIC ONLINE DETERMINATION OF MATERIAL PROPERTIES WHEN PRODUCING METALLIC STRIPS AND SHEETS

FIELD

The invention relates to a method for determining the material properties of a polycrystalline, in particular metallic, product, and a corresponding device or a device used for the same purpose.

BACKGROUND

According to the prior art, it is known that metallic strips and sheets, in particular hot- and cold-rolled and/or annealed Fe, Al, Ti, Ni, and other metallic alloys, are also monitored or checked in the course of the continuous production thereof in order to thereby control the resulting product properties. This also applies in the same way to ceramic materials, for example substrates made from $Al_2O_3$ or $ZrO_2$. By controlling process parameters, in particular strip temperature and/or speed in hot rolling, cold rolling, annealing, and inspection lines, the product properties can be optimized by means of online X-ray determination of anisotropic material properties.

The use of X-ray structure analysis to determine anisotropic, crystalline material properties is state-of-the-art for a laboratory scale. This method is based on the fact that a finely focused or a collimated, almost parallel X-ray beam is directed onto the sample and diffracted at the crystalline lattice of the sample. According to Bragg's equation, the diffraction angle depends on the lattice parameters and the wavelength of the X-ray beam. The resulting diffraction image is recorded with a detector. The quality and information content of the diffraction image recorded by the detector depend on the number of photons arriving at the detector and thus on the intensity of the X-ray beam and the exposure time.

EP 0 352 423 B1 discloses a method and a device for the texture analysis of rolled sheets and strips with the aid of X-rays radiating therethrough. In this case, the diffraction of the X-rays at the crystalline lattice structure of the examined material is analyzed and the texture values are calculated therefrom. The detectors used here are energy-dispersive and work with polychromatic X-rays. Such technology is also known from an article by Hermann-J. Kopineck et al. ("*Industrial on-line texture determination in rolled steel strips*"; Journal of Nondestructive Evaluation, Vol. 12, No. 1, 1993).

Furthermore, the use of angle-dispersive detectors which require monochromatic X-rays is known in connection with X-ray structure analysis. The monochromatic X-ray beam required for the angle-dispersive method is typically passed through a crystal filter which only allows the desired wavelength to pass. The X-ray beam is then bundled into a focused beam or a collimated beam by an X-ray optical unit, a collimator, or a capillary.

In industrial online X-ray structure analysis using the transmission or reflection method, the largest possible sample volume should be irradiated in the shortest possible time in order to generate an evaluable, statistically meaningful diffraction image of the material to be examined. The low, effectively usable intensity of the available X-ray sources has hitherto required long exposure times on the detector, which limit the method to thin strips and weakly absorbing workpieces. If the measurement is used for process control, the result is longer control response times and thus disruptions in the process sequence as well as lower productivity and product quality.

The small amount of effectively usable X-rays is due to the fact that the X-ray tube generates a strongly diverging, conical primary beam. Therefore, only some of the X-ray photons are emitted in the direction of the sample. An X-ray optical unit and capillary used for focusing absorb a large part of the X-ray intensity. In addition, capillaries in particular are not effective when using short-wave X-rays, such as, for example, tungsten $K\alpha$ radiation, due to the insufficient angle of total reflection on the capillary walls.

From EP 1 233 265 A it is known to examine the thickness of a galvanized layer on a metallic strip with the aid of X-ray structure analysis. Thus, according to this document, the coated zinc layer on a metallic strip is analyzed with regard to its thickness, in which the texture of the zinc layer and the metallic strip are not examined.

WO 2017/202904 A1 discloses a contactless and non-destructive determination of the properties of a metal product during the metallurgical production thereof according to the principle of X-ray diffraction. In this case, the microstructure of a metal product is determined using an X-ray source and an X-ray detector, the X-ray source and the X-ray detector each being arranged in an actively cooled receiving chamber and the metal product to be examined being passed between the X-ray source and the X-ray detector. The collimator used to focus the X-rays consists of a tube and/or a disk which only allows beams to pass through in the normal direction of the sample. Therefore, most of the divergent X-rays are shielded. In particular in the transmission method, however, a high level of beam intensity is required due to the high level of absorption in order to generate a high-contrast, statistically meaningful, high-resolution diffraction image that enables shorter exposure times and also larger sample thicknesses.

EP 3 372 994 A1 discloses a generic method according to the preamble of claim 1 and a generic device according to the preamble of claim 18.

SUMMARY

Accordingly, the object of the invention is to optimize the analysis of a polycrystalline product with regard to its material properties and to expand it to include a larger number of different product types.

The invention provides a method for determining the material properties of a polycrystalline, in particular metallic, product during production or quality control of the polycrystalline, in particular metallic, product by means of X-ray diffraction using at least one X-ray source and at least one X-ray detector. In this method, an X-ray generated by the X-ray source is directed onto a surface of the polycrystalline product and the resulting diffraction image of the X-ray is recorded by the X-ray detector. After exiting the X-ray source, the X-ray is passed through an X-ray mirror, the X-ray being both monochromatized and focused, by the X-ray mirror, in the direction of the polycrystalline product and/or the X-ray detector, and then reaching a surface of the metallic product, in which the X-ray detector is designed in the form of a surface detector.

In the same way, the invention also provides a device for determining the material properties of a polycrystalline, in particular metallic, product during production or quality control of the polycrystalline, in particular metallic, product by means of X-ray diffraction. Such a device comprises at least one X-ray source and at least one X-ray detector, an X-ray generated by the X-ray source being emitted onto a surface of the polycrystalline product and the resulting diffraction image of the X-ray being detectable by the X-ray detector. The device further comprises an X-ray mirror through which the X-ray generated by the X-ray source can be passed, the X-ray being both monochromatized and focused, by the X-ray mirror, in the direction of the polycrystalline product and/or the X-ray detector. The X-ray detector is designed in the form of a surface detector.

The polycrystalline product, the material properties of which can be determined by means of the present invention, can be metallic strips and sheets, for example hot- and cold-rolled and/or annealed Fe, Al, Ti, Ni, and other metallic alloys. As an alternative to this, the polycrystalline product can also consist of ceramic materials, in particular substrates made of $Al_2O_3$ or $ZrO_2$.

The present invention is based on the essential knowledge that, through the use of an X-ray mirror and its associated mirror surface, the X-ray generated is focused in the direction of the polycrystalline product to be examined and/or the X-ray detector, and the polychromatic radiation of the X-ray tube is monochromatized largely without loss. This advantageously increases the effectively effective or usable intensity of the X-ray, which is directed onto the product to be examined.

The X-ray mirror that is used in the present invention replaces a monochromator and thus also avoids the absorption loss otherwise caused by the monochromator or the $K\beta$ absorption filter. In addition, the primary X-ray is focused or parallelized. Compared to conventional multilayer systems, the structure of said X-ray mirror is more effective with regard to the beam yield and can be used more cost-effectively in operation because, for example, it is not necessary to generate a permanent vacuum.

Further advantages of the invention are a shorter control response time and a possible expansion of the measuring principle of the X-ray structure analysis to include thicker products (for example metallic strips) and more absorbent materials due to a better yield of the primary beam intensity generated by the X-ray tube. The application of the present invention results in a low-loss focusing or parallelization of the X-ray beam, which leads to a higher number of diffracted photons and thus to a higher effective intensity of the X-ray beam, an improved quality of the diffraction image, and thus to a better statistical reliability of the X-ray measurement.

In an advantageous refinement of the invention, the mirror surface of the X-ray mirror is designed to be spherically curved or cylindrical in relation to a central axis from which the X-ray is emitted by the X-ray source. The mirror surface of the X-ray mirror can consist of highly oriented graphite crystals, for example in the form of a foil-like coating that is attached to the inner circumferential surface of a rotationally symmetrical support body, this support body being part of the device according to the invention. In any case, the radiation emitted by the X-ray tube is both focused and monochromatized at the curved graphite crystal foils by Bragg's reflection. The focus is set via the curvature of the foil.

With regard to the support body of the X-ray mirror, reference is made separately at this juncture to the extent that it is preferably designed in the shape of a torus, i.e. toroidal, or annular in the cross-section. In any case, with this shape, it is important that the support body has a central opening through which the X-ray can enter the interior of the X-ray mirror and can also pass through the X-ray mirror.

In an advantageous refinement of the invention, the X-ray tube of the X-ray source can comprise a tungsten anode, a molybdenum anode, and/or a silver anode. In this case, the mirror surface of the X-ray mirror is designed in particular with its curvature in such a way that the X-ray generated by the X-ray tube is selected with its energy range about a predetermined line of the anode material with the Bragg's reflection.

In the event that the X-ray tube of the X-ray source comprises a tungsten anode, the selection of the energy range of the X-ray about the tungsten $K\alpha$ line takes place at a value of 60 keV or in the range of 60 keV.

In the event that the X-ray tube of the X-ray source comprises a molybdenum anode, the selection of the energy range of the X-ray about the molybdenum $K\alpha$ line takes place at a value of 17.5 keV or in the range of 17.5 keV.

In the event that the X-ray tube of the X-ray source comprises a silver anode, the selection of the energy range of the X-ray about the silver $K\alpha$ line takes place at a value of 25.5 keV or in the range of 25.5 keV.

With regard to the aforementioned tungsten, molybdenum, or silver materials, it is emphasized separately at this juncture that an anode of the X-ray tube of the X-ray source can be made of these materials or at least can have these materials.

The determination according to the invention of a material property of a polycrystalline product can take place according to the transmission principle or according to the reflection or retroreflective principle.

In the case of the transmission principle, the monochromatized and/or focused X-ray passes through the polycrystalline product. In this case, the X-ray source, on the one hand, and the X-ray detector, on the other hand, are arranged on respective different sides of the polycrystalline product.

In an advantageous refinement of the method according to the invention, if it is based on the transmission principle, the polycrystalline product can have a thickness of a maximum of 30 mm, preferably a maximum of 25 mm, more preferably a maximum of 20 mm, more preferably a maximum of 15 mm, more preferably a maximum of 10 mm, more preferably a maximum of 5 mm. With regard to the aforementioned values, it goes without saying that this can in each case be a possible upper limit for the thickness of the polycrystalline product.

As explained above, the method according to the invention can also be carried out according to the reflection or retroreflective principle. In this case, the X-ray source and the X-ray detector are arranged on the same side of the polycrystalline product, the X-ray generated by the X-ray source being reflected at least on or in a layer of the polycrystalline product close to the surface.

In an advantageous refinement of the method according to the invention, if this is based on the reflection or retroreflective principle, the polycrystalline product can have a thickness of at least 0.1 mm. The polycrystalline product can preferably also have a thickness of 0.2 mm, more preferably of 0.3 mm, more preferably of 0.4 mm, more preferably of 0.5 mm, more preferably of 0.6 mm, more preferably of 0.7 mm, more preferably of 0.8 mm, more preferably of 0.9 mm, more preferably of 1 mm, more preferably of at least 2 mm, more preferably of at least 3 mm, more preferably of at least 4 mm, more preferably of at least 5 mm, more preferably of at least 6 mm, more preferably of at least 7 mm, more preferably of at least 8 mm, more preferably of at least 9 mm, more preferably of at least 10 mm, more preferably of at least 20 mm, more preferably of at least 100 mm, or more preferably a thickness of more than 200 mm. With regard to the aforementioned values, it goes without saying that this can in each case be a possible lower limit for the thickness of the polycrystalline product.

With regard to the possibility that the method according to the invention is based on the reflection or retroreflective principle, it should be pointed out in addition that it is also possible to examine a coating on the surface of a polycrystalline product and to determine at least one material property therefrom.

Further advantages of the invention are as follows:

Increasing the effectively usable X-ray intensity on the sample or on the polycrystalline product to be examined.

Creating a sharper, more detailed diffraction image on the detector.

Expanding the field of application to include thicker strips and workpieces with a thickness of >>1 mm by using high-energy, focused X-rays in the transmission method.

Expanding the field of application to include more absorbent materials (e.g. zinc, copper, brass, and other copper alloys), which hitherto could not be examined with conventional X-rays.

Determining additional material properties via the crystal orientation; in particular of physical mechanical parameters, such as, e.g., anisotropic plastic and anisotropic elastic behavior, electromagnetic properties, degree of recrystallization, and/or grain size.

Shortened response time and improved control in material treatment systems.

BRIEF DESCRIPTION OF THE FIGURES

Preferred exemplary embodiments of the invention are described in detail below with the aid of a schematically simplified drawing.

The following is shown.

DETAILED DESCRIPTION

Figure 1:
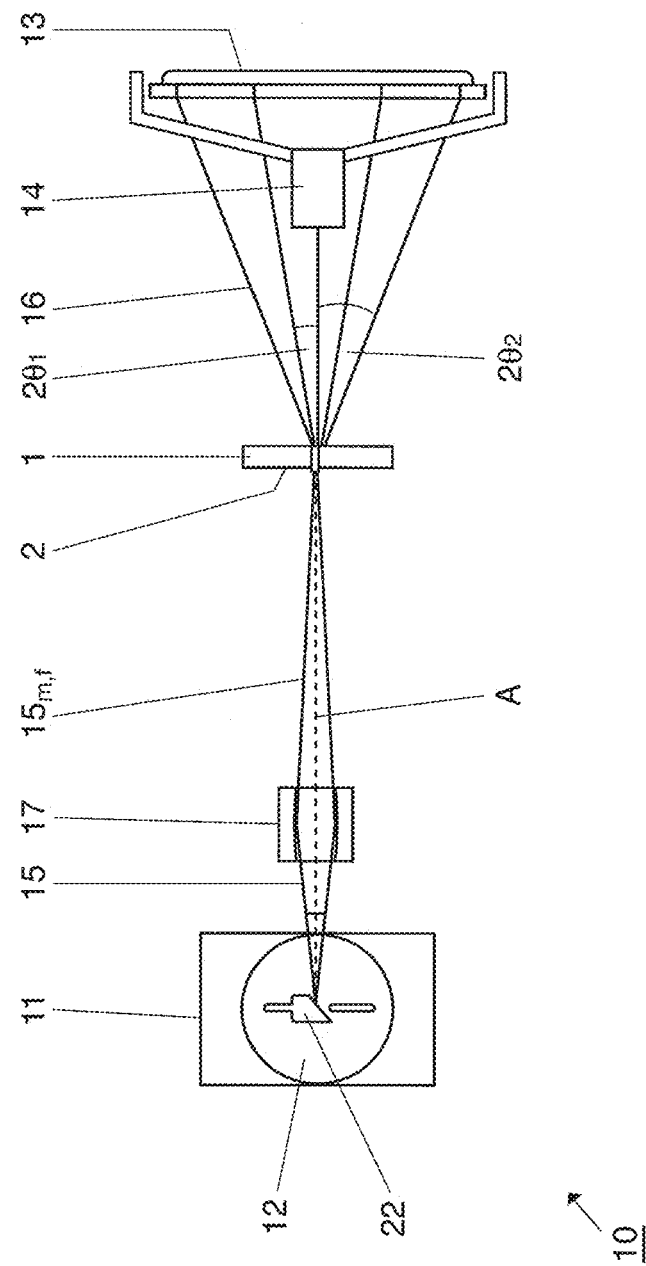
FIG. 1 representation of a device according to the invention according to a first embodiment.

In the following, preferred embodiments of a device 10 and a corresponding method according to the present invention are shown and explained with reference to FIGS. 1-8 in order to determine at least one material property of a polycrystalline product during the production thereof or during an associated quality control. Equivalent features in the drawings are each provided with the same reference numerals. At this juncture, separate reference is made to the effect that the drawing is only shown in a simplified manner and, in particular, is not true-to-scale.

FIG. 1 shows a simplified first embodiment of the device 10 according to the invention, with which at least one material property of a polycrystalline, in particular metallic, polycrystalline product 1 can be determined according to the transmission principle.

The device 10 comprises at least one X-ray source 11 and at least one X-ray detector 13. In this regard, FIG. 1 illustrates that the X-ray source 11 and the X-ray detector 13 are arranged on respective different sides of the polycrystalline product 1.

The X-ray source 11 comprises an X-ray tube 12 which has an anode 22. This anode 22 can consist of tungsten, molybdenum, or silver materials, or at least one of these materials.

The device 10 comprises an X-ray mirror 17 which is arranged between the X-ray source 11 and the polycrystalline product 1 to be examined. The X-ray mirror 17 is designed to be rotationally symmetrical and comprises a mirror surface 18 on its inner circumferential surface (see FIG. 3). Further details with regard to the X-ray mirror 17 are explained separately below.

The X-ray 15 generated by the X-ray source 11 has a central axis A.

The X-ray 15 emitted by the X-ray source 11 first passes through the X-ray mirror 17. In this case, the X-ray 15 experiences a Bragg's reflection, the X-ray 15 being both monochromatized and focused on the direction of the polycrystalline product 1 and then reaching a surface 2 of the polycrystalline product 1.

In FIG. 1, the part of the X-ray 15 which has been monochromatized by the Bragg's reflection on the mirror surface 18 of the X-ray mirror 17 and focused on the direction of the polycrystalline product 1 is denoted by "$15_{m,f}$". In addition, or as an alternative, this monochromatized X-ray $15_{m,f}$ can also be focused on the direction of the X-ray detector 13.

In the embodiment of FIG. 1, the X-ray $15_{m,f}$ is diffracted at the crystal lattice of the material after it reaches the polycrystalline product 1 and while passing through the product 1. As already explained at the beginning, the diffraction angle depends, according to Bragg's equation, on the lattice parameters of the material and the wavelength of the incident X-ray.

In FIG. 1, the resulting diffraction image of the X-ray is designated by "16", this diffraction image then being recorded with the X-ray detector 13. In this case, angles by which the resulting diffraction image 16 is fanned out with respect to or relative to the central axis A are designated, for example, by "$2\theta_1$" and "$2\theta_2$", respectively.

A second blocking body 14 ("beam stop") is arranged adjacent the X-ray detector 13 on the side of the polycrystalline product 1 on which the X-ray detector 13 is located. This second blocking body 14 has the effect that X-rays which have passed through the polycrystalline product 1 on the central axis A and have not been diffracted are shaded and accordingly do not reach the X-ray detector 13 in order to protect the detector from possible damage.

The examination method of the polycrystalline product 1 with the embodiment of FIG. 1 according to the transmission principle is limited by the exposure time and the wavelength and intensity of the X-ray 15 as well as by the thickness of the polycrystalline product 1 to be irradiated. Nevertheless, such a measuring method based on the transmission principle has the advantage that the (material) properties of the polycrystalline product 1 can be recorded over its entire thickness.

In any case, the measurement method based on the transmission principle is particularly suitable for products 1 with a small thickness, for example for thin metal or steel sheets, which can have a thickness of less than 10 mm, preferably less than 5 mm, more preferably less than 1 mm.

Figure 2:
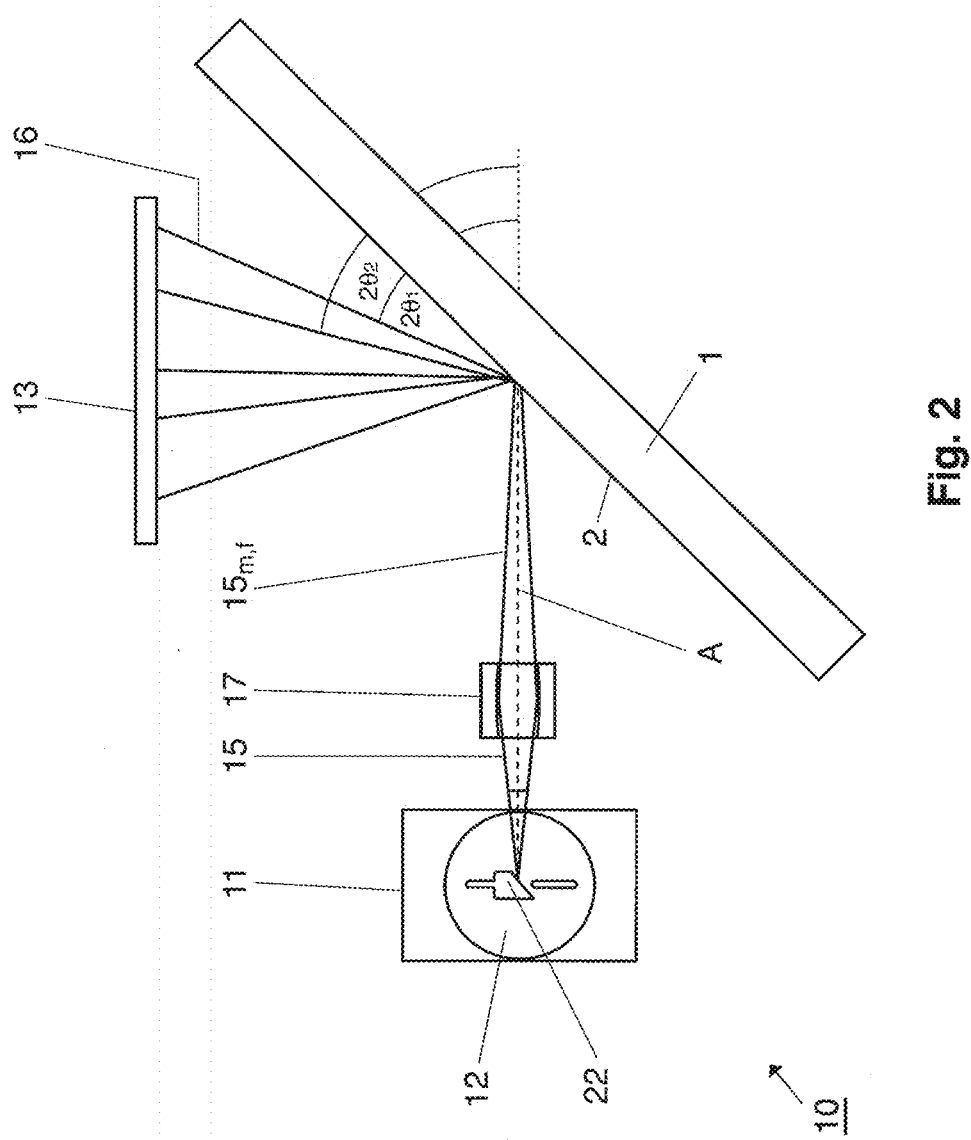
FIG. 2 representation of a device according to the invention according to a second embodiment.

FIG. 2 shows a simplified second embodiment of the device 10 according to the invention, with which at least one material property of a polycrystalline, in particular metallic, product can be determined according to the reflection or retroreflective principle. In contrast to the embodiment of FIG. 1, the X-ray detector 13 in this case is arranged on the same side of the polycrystalline product 1 to be examined as the X-ray source 11.

With the examination method of the polycrystalline product 1 with the embodiment of FIG. 2 according to the reflection principle, the X-ray, which is obliquely incidental as relates to the surface 2 of the product 1, is reflected at the crystal lattice in accordance with Bragg's equation. The thickness of the irradiated surface layer depends not only on the angle of incidence and the exposure time, but also on the wavelength and the intensity of the X-ray source. Although the retroreflective method can only cover areas close to the surface, it can do so also with comparatively thick products 1, for example with metal or steel sheets with a thickness of more than 10 mm, preferably more than 100 mm, more preferably with a thickness of more than 200 mm.

In the same manner as in the illustration of FIG. 1, the resulting diffraction image, which results from the X-ray reflected on the surface 2 of the polycrystalline body 1, is designated with "16" for the embodiment of FIG. 2. In detail, the resulting diffraction angles are also dimensioned relative to the central axis A and are designated, for example, with "$2\theta_1$" and "$2\theta_2$".

Moreover, in the embodiment of FIG. 2, a monochromatized and focused X-ray $15_{m,f}$ can be generated by the X-ray mirror 17 in the same way as in FIG. 1, so that reference is made to the explanations for FIG. 1 to avoid repetition.

Figure 4:
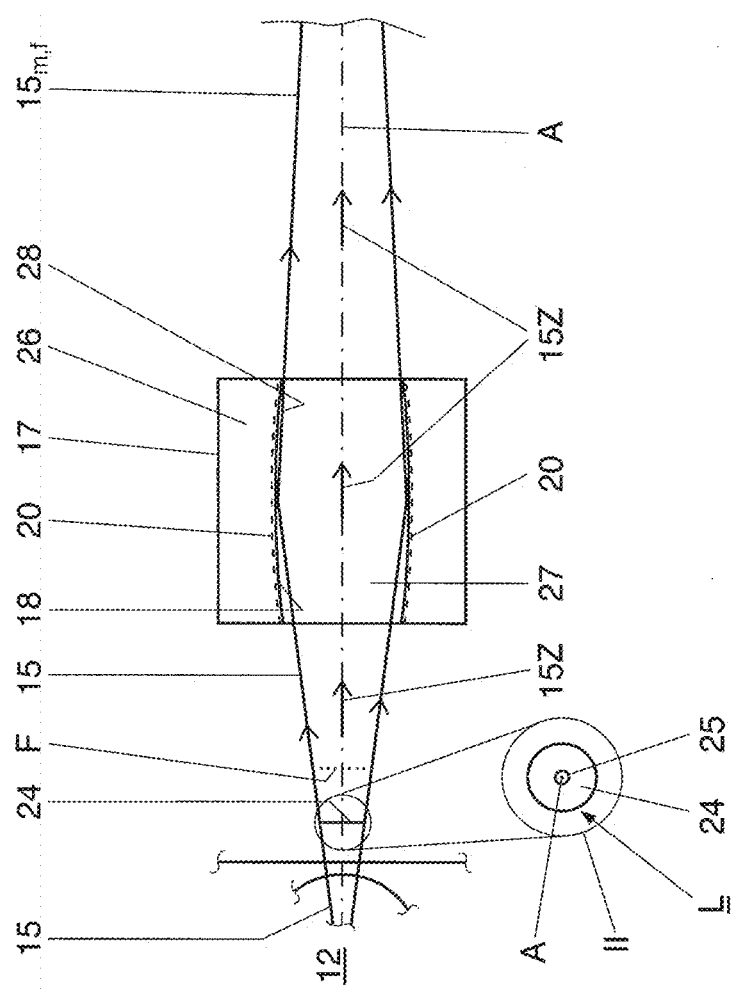
FIG. 4 a variant for focusing the X-ray on the direction of the product to be examined.
Figure 5:
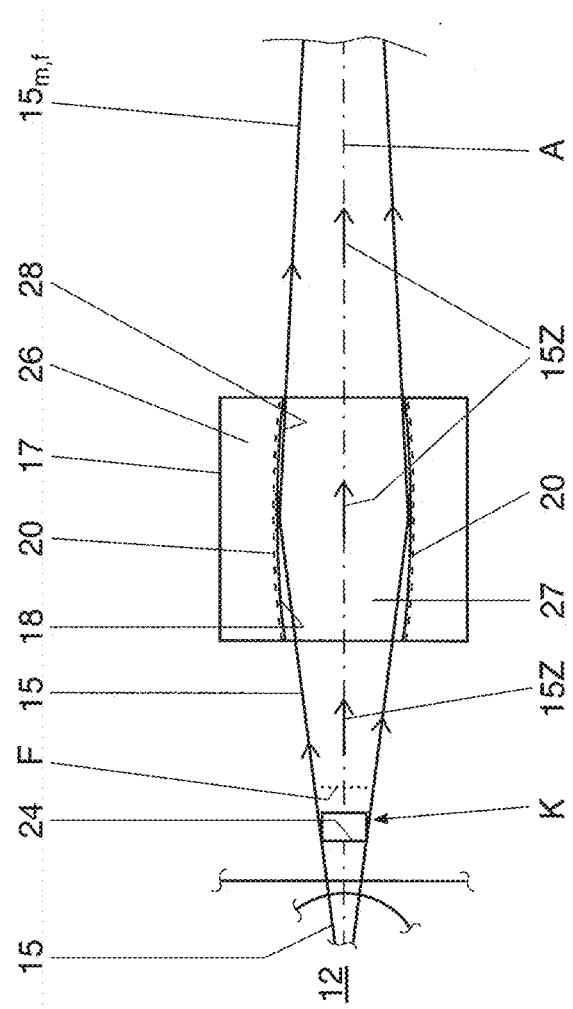
FIG. 5 a variant for focusing the X-ray on the direction of the product to be examined.

Further variants with details of the device 10 for generating the focused and/or monochromatized X-rays are explained below with reference to FIGS. 3-5. These variants according to FIGS. 3-5 are to be understood as alternatives and can be used both in the first embodiment of the device 10 according to the invention from FIG. 1 and in the second embodiment from FIG. 2.

Figure 3:
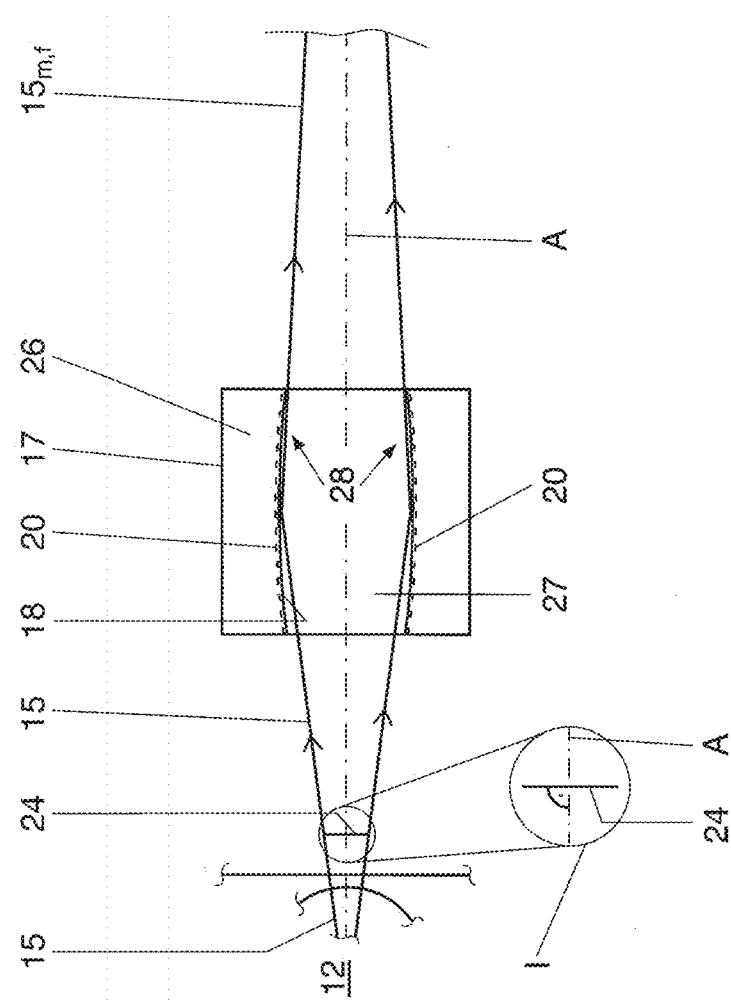
FIG. 3 a variant for focusing the X-ray on the direction of the product to be examined.

FIG. 3 shows a simplified longitudinal sectional view through the X-ray mirror 17.

The X-ray mirror 17 comprises a rotationally symmetrical support body 26, which is preferably toroidal or in the shape of a torus or annular in the cross-section and, in any case, has a central opening 27.

The above-mentioned mirror surface 18 of the X-ray mirror 17 is formed or provided on an inner circumferential surface 28 of the support body 26.

The mirror surface 18 of the X-ray mirror 17 is preferably designed to be spherically curved with respect to the central axis A, from which the X-ray 15 is emitted by the X-ray source 11, and the associated X-ray tube 12 (shown on the left in the image area of FIG. 3).

The mirror surface 18 of the X-ray mirror 17 can consist of highly oriented graphite crystals, which are attached to the inner circumferential surface 28 of the support body 26, for example in the form of a foil-like coating 20.

As an alternative to this, it is possible for the highly oriented graphite crystals to be applied physically or chemically to the inner circumferential surface 28 of the support body 26.

In any case, the highly oriented graphite crystals or graphite crystal foils 20 can each consist of crystallographically highly oriented pyrolytic graphite crystals (HOPG, HAPG).

In the variant of FIG. 3, a first blocking body 24, for example in the form of a plate-shaped disk, is arranged between the X-ray tube 12 and the X-ray mirror 17.

The area I in FIG. 3 shows an enlargement of the first blocking body 24 in a side view and indicates that it is arranged with its surface extension orthogonal to the central axis A, i.e., at an angle of 90° to the central axis A.

The X-ray 15 emitted by the X-ray tube 12 initially reaches the first blocking body 24. In this case, the effect achieved with the first blocking body 24 is that a part of the X-ray passes the outer circumference of the blocking body and is thereby outwardly fanned out.

The part of the X-ray 15 that is outwardly fanned out then reaches the X-ray mirror 17 and is reflected therein on the mirror surface 18. As already explained for FIG. 1, this part of the X-ray is then monochromatized by the Bragg's reflection on the mirror surface 18 of the X-ray mirror 17 and then exits the X-ray mirror 17 as a monochromatized and focused X-ray $15_{m,f}$ (to the right in FIG. 3) in the direction of the polycrystalline product 1 and/or in the direction of the X-ray detector 13.

The variant according to FIG. 4 differs from the variant according to FIG. 3 only in the design of the first blocking body 24.

Region II of FIG. 4 shows an enlargement of the first blocking body 24 in a front view and indicates that it is designed as a pinhole L with a passage opening 25. The fact remains here that the first blocking body 24, as shown in area I of FIG. 3, is arranged with its surface extension orthogonal to the central axis A.

The passage opening 25 formed in the first blocking body 24 according to the variant of FIG. 4 causes the effect that the part, close to the axis, of the primary beam of the X-ray, said part designated with "15Z" in FIG. 4, first passes through said passage opening 25 and then also through the central opening 27 of the X-ray mirror 17 without coming into contact or having interaction with the mirror surface 18 of the X-ray mirror 17. In other words, the part 15Z, close to the axis, of the primary beam of the X-ray passes through the central opening 27 of the X-ray mirror 17 in the direction of the polycrystalline product 1 to be examined, without being reflected on the mirror surface 18 of the X-ray mirror.

The further effect of the first blocking body 24, as already explained for the variant from FIG. 3 in that the X-ray 15 passes by the outer circumference of the first blocking body 24 and is outwardly fanned out in the direction of the X-ray mirror 17, is still ensured with the variant from FIG. 4.

In the variant from FIG. 3, a filter F is also provided, which can be arranged, for example, between the X-ray tube 12 and the X-ray mirror 17. In any case, this filter F is preferably arranged on the central axis A or at least close to it and ensures that the part 15Z of the X-ray extending close to or on the central axis A after passing through the passage opening 25 is suitably monochromatized.

In the case of a tungsten anode, the filter F has the materials ytterbium or hafnium or consists of such materials. Furthermore, it is pointed out with regard to the filter F that this filter F, in the case of a molybdenum anode, has the material zirconium or consists of the material zirconium, and/or that the filter F, in the case of a silver anode, has the material rhodium or consists of the material rhodium.

In a departure from the illustration in FIG. 4, the filter F can also be arranged in a different position, for example to the right of the X-ray mirror 17 and, in any case, in front of the polycrystalline product 1 to be examined.

With the aid of the filter F, it is achieved that the part 15Z, close to the axis, of the X-ray is suitably monochromatized before it reaches the surface 2 of the polycrystalline product 1.

The above-explained effect of the passage opening 25, with which the first blocking body 24 is designed as a pinhole L in the variant according to FIG. 4, means that two radiation portions of the X-ray reach the surface 2 of the polycrystalline product 1 to be examined, that being both the X-ray $15_{m,f}$ monochromatized and focused with the aid of the X-ray mirror 17 and the part 15Z, near the axis, of the primary beam of the X-ray that has been monochromatized by the filter F. With these two portions of the same energy of the X-ray, the material properties of the polycrystalline product 1 to be examined are then determined, namely either with the transmission principle according to the first embodiment of the device 10 from FIG. 1 or with the reflection principle according to the second embodiment of the device 10 from FIG. 2.

The variant according to FIG. 5 differs from the variant according to FIG. 4 only in the design of the first blocking body 24. In the variant from FIG. 5, the first blocking body 24 is designed in the form of a particularly tube-shaped collimator K. With such a collimator K, the same effects are achieved as with the variant from FIG. 4, namely both a fanning out of the X-ray 15, which propagates on an outer circumference thereof, outwardly in the direction of the X-ray mirror 17 and also passage of the part 15Z, close to the axis, of the primary beam of the X-ray.

In the variant from FIG. 5, a filter F is also provided, with which the part 15Z, close to the axis, of the primary beam of the X-ray, which does not interact with the mirror surface 18 of the X-ray mirror 17, is suitably monochromatized.

With regard to the variants according to FIG. 4 and FIG. 5, it can be emphasized separately at this juncture that a diameter of the passage opening 25 of the pinhole L or a diameter and a longitudinal extension of the collimator K are selected such that the part 15Z, close to the axis, of the primary beam of the X-ray is allowed to pass through there up to a divergence angle of 10°.

As an alternative to this, it is also possible to select the diameter of the passage opening 25 or the dimensions of the collimator K in terms of diameter and longitudinal extension such that the divergence angle for the part 15Z, close to the axis, of the primary beam of the X-ray that is passed through is less than 10°, and for example assumes the value of 9.5°, 9°, 8.5°, 8°, 7.5°, 7°, 6.5°, 6°, 5.5°, 5°, or even lower values. The above-mentioned exemplary values, including all possible values in between (for example 9.8°, 9.4°, 9.3°, 8.6°, 8.1°, etc.), each represent upper limits for the divergence angle which results for the part 15Z, close to the axis, of the primary beam of the X-ray when passing through the passage opening 25 or through the collimator K.

Figure 6:
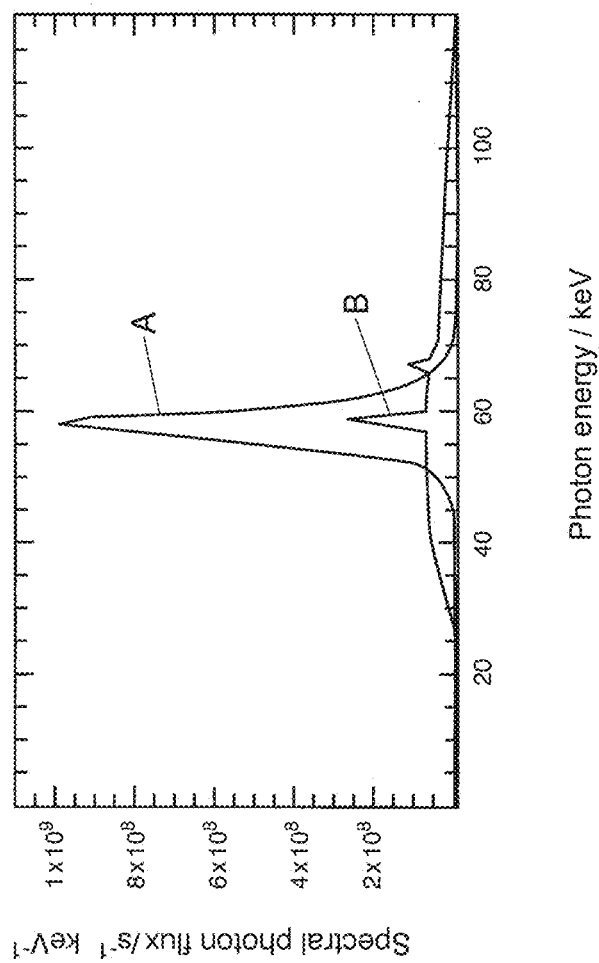
FIG. 6 an exemplary diagram of the beam intensity over the photon flux.

The illustration from FIG. 6 shows two spectra, A (with X-ray optics without collimator and filter) and B (with collimator and filter without X-ray optics), for the spectral photon flux as a function of the photon energy as an example of an X-ray tube 12 with a tungsten anode. From this figure it is clear that the beam intensity represented by the photon flux, in the energy range about the Kα fluorescence line of the tungsten tube, can be increased by about five-fold by using the X-ray mirror optics in the form of the X-ray mirror 17.

Figure 7:
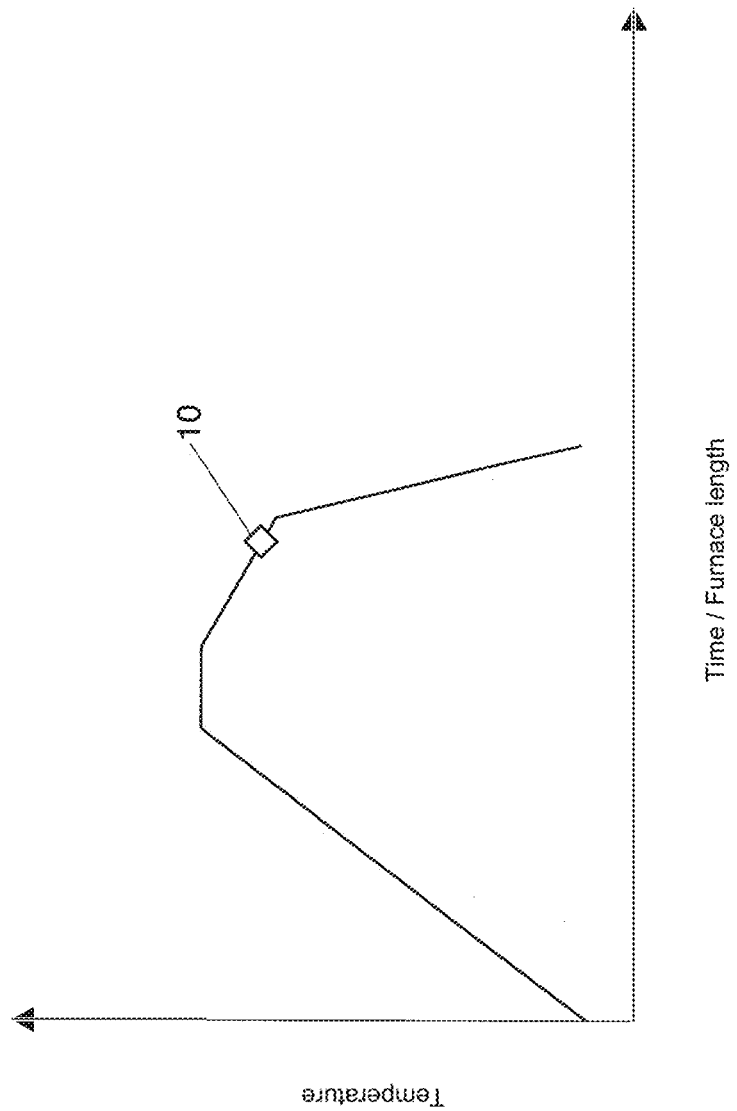
FIG. 7 a simplified application example of the use of a device according to the invention in a production system.

In connection with an example for a production line, the illustration from FIG. 7 schematically shows a possible arrangement of the device 10 according to the invention in relation to the process sequence for the polycrystalline product 1 to be examined, which in this case, for example, is a strip-shaped material made of metal or steel, as a function of time or furnace length.

Figure 8:
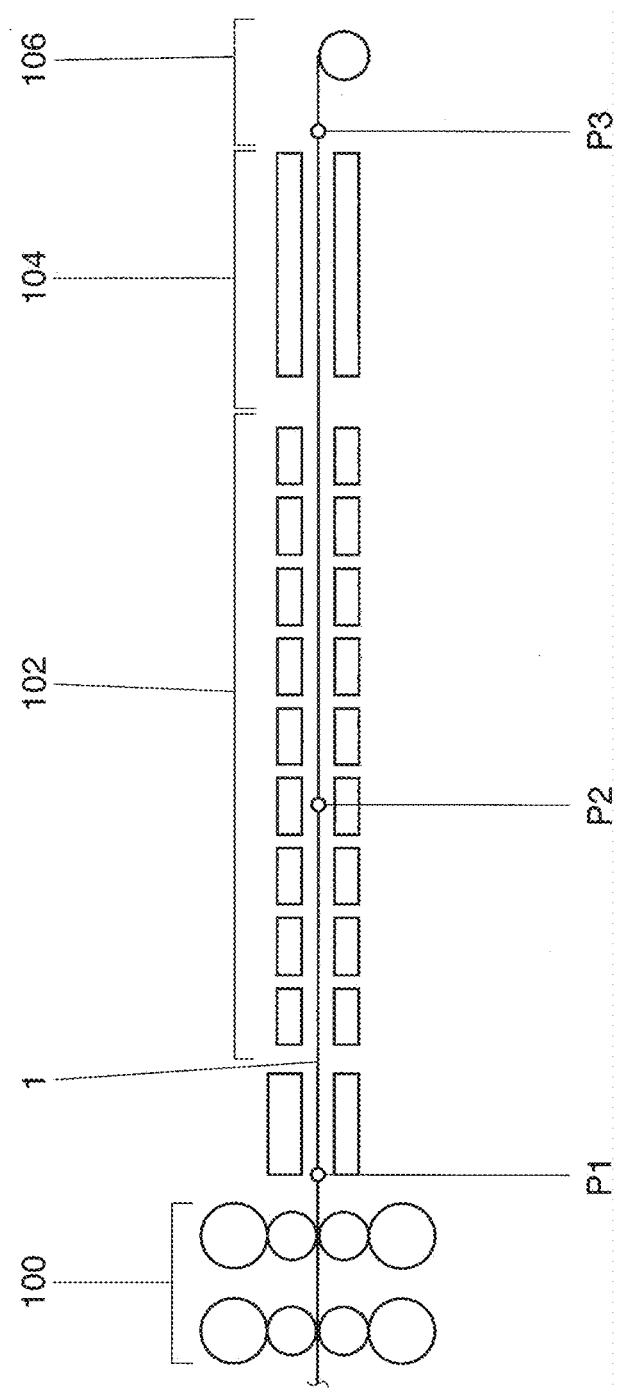
FIG. 8 further examples of a use of the device according to the invention in a production system.

Finally, reference is made to the illustration from FIG. 8, in which a further example of a production line for a strip-shaped material 1 is shown in a greatly simplified manner, in which the strip-shaped material, for example a slab and/or a steel sheet, is transported from the left to the right in the plane of the drawing and is wound up by a reel 106 on the far right. Further possible components of this production line consist of at least one rolling mill 100, a cooling section 104, and a transport section 104. The possible positions at which the device 10 according to the invention can be arranged within this production line and/or a measuring process according to the method of the invention can be carried out are indicated by the designations "P1", "P2", and "P3" in FIG. 8. In this regard, it goes without saying that the device 10 and the corresponding method according to the present invention can be arranged or carried out at one or more of these positions P1-P3.

The embodiments of the device 10 according to the invention explained above enable a considerable improvement in the effective primary beam intensity and thus also in the diffracted radiation which is set on or through the examined polycrystalline product 1. This results in the following additional advantages:

- Shortened control response time which can be provided in connection with the device 10.
- Improved control by determining additional anisotropic material properties, in particular crystal orientation, degree of recrystallization, and grain size.
- Expansion of the application to handle thicker strips and workpieces.
- The use of HOPG/HAPG optics provides considerable gains in intensity compared to the Kβ absorption filter used up to now. Furthermore, there are cost advantages compared to multilayer mirrors as regards operation and when purchasing.
- Shorter exposure time and thus higher resolution on moving products, especially moving belts in annealing systems or rolling mills.
- Expansion of the application to include more absorbent materials
- Better measurement results thanks to better image quality with stronger contrast, higher resolution, and improved counting statistics
- Direct, novel, and fast mathematical texture analysis from the diffraction images. On the basis of the results of the texture analysis, mechanical parameters such as anisotropic elastic material behavior or anisotropic plastic behavior (r-value) can be determined on-line, so that continuous quality assurance is guaranteed.
- Statements about grain sizes can also be made from the diffraction images.
- By using modern, quickly readable semiconductor surface detectors for angle-dispersive data acquisition, the problems (strong detector cooling, low depth of information regarding the crystal orientation) of energy-dispersive measurement methods can be avoided. The control response time is considerably improved due to the quick readout of the measurement data and evaluation thereof.

LIST OF REFERENCE NUMERALS

1 Polycrystalline (e.g., metallic) product
2 Surface (of the product 1)

10 Device
11 X-ray source
12 X-ray tube
13 X-ray detector
14 Second blocking body ("beam stop")
15 X-ray
$15_{m,f}$ Monochromatized and focused X-ray
15Z Part of the X-ray near or on the central axis A
16 Diffraction image (of the X-ray)
17 X-ray mirror
18 Mirror surface (of the X-ray mirror 17)
20 Graphite crystal foil
22 Anode (of the X-ray tube 12)
24 First blocking body ("beam stop")
25 Passage opening (of the blocking body 24)
26 Support body
27 Central opening (of the support body 26)
28 Inner circumferential surfaces
100 Rolling mill
102 Cooling section
104 Transport section
106 Reel
A Central axis
F Filter
K Collimator
L Pinhole
P1 First possible measurement position (for the device 10)
P2 Second possible measurement position (for the device 10)
P3 Third possible measurement position (for the device 10)

The invention claimed is:

1. A device for determining the material properties of a polycrystalline product during a production or a quality control of the polycrystalline product by means of an X-ray diffraction, comprising:
at least one X-ray source;
at least one X-ray detector; and
an X-ray mirror comprising a rotationally symmetrical support body, with a central opening and an inner circumferential surface defined by the central opening;
wherein an X-ray generated by the at least one X-ray source can be emitted onto a surface of the polycrystalline product by means of the X-ray mirror, and a resulting diffraction image of the X-ray can be detected by the at least one X-ray detector, wherein the X-ray generated by the at least one X-ray source can be guided through the X-ray mirror,
wherein a mirror surface is formed on the inner circumferential surface of the rotationally symmetrical support body, and the X-ray is both monochromatized and focused by the X-ray mirror in a direction of the polycrystalline product or in a direction of the polycrystalline product and the at least one X-ray detector,
wherein the at least one X-ray detector is designed in a form of a surface detector, and
wherein the polycrystalline product is a metallic product.

2. The device according to claim 1, wherein the rotationally symmetrical support body is toroidal or annular in a cross-section.

3. The device according to claim 2, wherein the mirror surface of the X-ray mirror is spherically curved or cylindrical with respect to a central axis from which the X-ray is emitted by the at least one X-ray source.

4. The device according to claim 2, wherein the mirror surface of the X-ray mirror consists of highly oriented graphite crystals.

5. The device according to claim 4, wherein the highly oriented graphite crystals are attached to the inner circumferential surface of the rotationally symmetrical support body in a form of a foil-like coating.

6. The device according to claim 4, wherein the highly oriented graphite crystals are applied physically or chemically to the inner circumferential surface of the rotationally symmetrical support body.

7. The device according to claim 4, wherein each of the highly oriented graphite crystals consists of crystallographically highly oriented pyrolytic graphite crystals.

8. The device according to claim 1, further comprising:
a first blocking body, which is arranged between the at least one X-ray source and the X-ray mirror,
wherein a part of the X-ray is shaded after exiting the at least one X-ray source.

9. The device according to claim 8, wherein the first blocking body is plate-shaped, and a surface extension of the first blocking body is aligned orthogonally to a central axis from which the X-ray is emitted by the at least one X-ray source.

10. The device according to claim 8, wherein the first blocking body is designed as a pinhole with a passage opening or as a collimator, wherein a diameter of the passage opening of the pinhole or a diameter and a longitudinal extension of the collimator are selected such that the part of the X-ray, close to a central axis of a primary beam of the X-ray, which passes through the passage opening or the collimator, is passed through up to a divergence angle of 10°.

11. The device according to claim 1, further comprising:
a filter, with which a part of the X-ray, close to a central axis of a primary beam of the X-ray is monochromatized and focused,
wherein the filter, in a case a tungsten anode, has materials ytterbium or hafnium or consists of materials ytterbium or hafnium, and/or in that the filter, in a case of a molybdenum anode, has a material zirconium or consists of a material zirconium, and/or in that the filter, in a case of a silver anode, has a material rhodium or consists of a material rhodium.

12. The device according to claim 1, wherein the at least one X-ray source comprises an X-ray tube comprising at least one anode consisting of tungsten, molybdenum, and/or silver.

13. The device according to claim 1, wherein the at least one X-ray source and the at least one X-ray detector are arranged on respective different sides of the polycrystalline product, wherein the X-ray generated by the at least one X-ray source passes through the polycrystalline product.

14. The device according to claim 13, further comprising:
a second blocking body, which is arranged adjacent the at least one X-ray detector and on a central axis from which the X-ray is emitted by the at least one X-ray source.

15. The device according to claim 1, wherein the at least one X-ray source and the at least one X-ray detector are arranged on a same side of the polycrystalline product, wherein the X-ray generated by the at least one X-ray source is reflected on a surface of the polycrystalline product.

16. The device according to claim 1, wherein the mirror surface is rotationally symmetrical with respect to a central axis from which the X-ray is emitted by the at least one X-ray source.

17. A method for determining material properties of a polycrystalline product by means of an X-ray diffraction using at least one X-ray source and at least one X-ray detector, comprising:
  generating an X-ray by the at least one X-ray source;
  directing the generated X-ray onto a surface of the polycrystalline product and/or the at least one X-ray detector by passing the X-ray though an X-ray mirror, the X-ray mirror being rotationally symmetrical and comprising a mirror surface on an inner circumferential surface so that the X-ray experiences a Bragg's reflection on the mirror surface of the X-ray mirror, and the X-ray is both monochromatized and focused in a direction of the polycrystalline product or in a direction of the polycrystalline product and the at least one X-ray detector; and
  recording by the at least one X-ray detector a resulting diffraction image of the X-ray, the at least one X-ray detector being a surface detector,
  wherein the polycrystalline product is a metallic product.

18. The method according to claim 17, wherein the X-ray is passed through the X-ray mirror with the mirror surface that is spherically curved or cylindrical with respect to a central axis from which the X-ray is emitted by the at least one X-ray source.

19. The method according to claim 18, wherein the at least one X-ray source comprising an X-ray tube that comprises a tungsten anode, a molybdenum anode, and/or a silver anode, and the X-ray is passed through the X-ray mirror having the mirror surface designed with a curvature in such a way that the X-ray generated by the X-ray tube during the Bragg's reflection is selected with an energy range about a predetermined line of an anode material.

20. The method according to claim 19, wherein the at least one X-ray source comprising the X-ray tube that comprises a tungsten anode, wherein a selection of the energy range of the X-ray about a tungsten Kα line takes place at a value of 60 keV.

21. The method according to claim 19, wherein the at least one X-ray source comprising the X-ray tube that comprises a molybdenum anode, wherein a selection of the energy range of the X-ray about a molybdenum Kα line takes place at a value of 17.5 keV.

22. The method according to claim 19, wherein the at least one X-ray source comprising the X-ray tube that comprises a silver anode, wherein a selection of the energy range of the X-ray about a silver Kα line takes place at a value of 25.5 keV.

23. The method according to claim 17, wherein after exiting the at least one X-ray source, a part of the X-ray is shaded by a first blocking body arranged in a region of a central axis from which the X-ray is emitted by the at least one X-ray source.

24. The method according to claim 23, wherein the part of the X-ray is shaded by the first blocking body which is plate-shaped, and a surface extension of the first blocking body is oriented orthogonally to the central axis so that a part of the X-ray passes by the first blocking body in a direction of the X-ray mirror and is thereby outwardly fanned out and then reaches the mirror surface of the X-ray mirror.

25. The method according to claim 23, wherein the part of the X-ray is shaded by the first blocking body which is designed as a pinhole with a passage opening or in a form of a collimator, so that the part of the X-ray, close to the central axis of a primary beam of the X-ray passes through the passage opening or the collimator and then passes through a central opening of the X-ray mirror in the direction of the polycrystalline product without reaching the mirror surface of the X-ray mirror.

26. The method according to claim 25, wherein a diameter of the passage opening of the pinhole or a diameter and a longitudinal extension of the collimator are selected such that the part of the X-ray, close to the central axis of the primary beam of the X-ray is allowed to pass through up to a divergence angle of 10°.

27. The method according to claim 25, wherein the part of the X-ray which extends close to or on the central axis is monochromatized by means of a suitable filter, wherein the suitable filter, in a case of a tungsten anode, has materials ytterbium or hafnium or consists of materials ytterbium or hafnium, and/or in that the suitable filter, in a case of a molybdenum anode, has a material zirconium or consists of a material zirconium, and/or in that the suitable filter, in a case of a silver anode, has a material rhodium or consists of a material rhodium.

28. The method according to claim 17, wherein the monochromatized and focused X-ray passes through the polycrystalline product.

29. The method according to claim 28, wherein the monochromatized and focused X-ray passes through the polycrystalline product having a thickness of a maximum of 30 mm.

30. The method according to claim 28, wherein after passing through the polycrystalline product, the monochromatized and focused X-ray extends at least on a central axis and is shaded by a second blocking body arranged on the central axis and adjacent the at least one X-ray detector.

31. The method according to claim 17, wherein the monochromatized and focused X-ray is reflected at least in a near-surface layer of the polycrystalline product.

32. The method according to claim 31, wherein the monochromatized and focused X-ray is reflected at least in the near-surface layer of the polycrystalline product having a thickness of at least 0.1 mm.

33. A method for determining material properties of a polycrystalline product during a production or a quality control of the polycrystalline product by means of an X-ray diffraction, comprising:
  determining the material properties of the polycrystalline product using a device according to claim 1.

* * * * *